(12) United States Patent
Effertz et al.

(10) Patent No.: US 10,315,390 B2
(45) Date of Patent: Jun. 11, 2019

(54) VEHICLE COMPOSITE PANE WITH AN INTEGRATED LIGHT SENSOR

(71) Applicant: SAINT-GOBAIN GLASS FRANCE, Courbevoie (FR)

(72) Inventors: Christian Effertz, Aachen (DE); Klaus Schmalbuch, Goult (FR); Dirk Wohlfeil, Raeren (BE); Detlev Duerkop, Huerth (DE); Guido Schwinges, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/737,675

(22) PCT Filed: Nov. 14, 2016

(86) PCT No.: PCT/EP2016/077534
§ 371 (c)(1),
(2) Date: Dec. 18, 2017

(87) PCT Pub. No.: WO2017/097536
PCT Pub. Date: Jun. 15, 2017

(65) Prior Publication Data
US 2018/0111356 A1 Apr. 26, 2018

(30) Foreign Application Priority Data
Dec. 7, 2015 (EP) .................................... 15198195

(51) Int. Cl.
*B32B 3/02* (2006.01)
*B32B 17/10* (2006.01)
(Continued)

(52) U.S. Cl.
CPC .. *B32B 17/10165* (2013.01); *B32B 17/10036* (2013.01); *B32B 17/1077* (2013.01);
(Continued)

(58) Field of Classification Search
CPC ........ B32B 17/10165; B32B 17/10036; B32B 17/10293; B32B 17/10761;
(Continued)

(56) References Cited

U.S. PATENT DOCUMENTS 4,968,895 A 11/1990 Leclercq
6,376,824 B1 * 4/2002 Michenfelder ...... B60Q 1/1423
250/214 R
(Continued)

FOREIGN PATENT DOCUMENTS

DE 102009053465 A1 5/2011
EP 2100722 A2 9/2009

OTHER PUBLICATIONS

International Search Report for International Application No. PCT/EP2016/077534 filed Nov. 14, 2016 on behalf of Saint-Gobain Glass France, dated Jan. 25, 2017. 7 pages. (German + English Translation).
(Continued)

*Primary Examiner* — Elizabeth E Mulvaney
(74) *Attorney, Agent, or Firm* — Steinfl + Bruno LLP

(57) ABSTRACT

A vehicle composite pane with an integrated light sensor is presented. The vehicle composite pane includes an outer pane and an inner pane that are bonded to one another via a thermoplastic intermediate layer. A photodiode situated on a circuit board is arranged between the outer pane and the inner pane, wherein the photodiode is a surface-mounted device (SMD) component.

20 Claims, 4 Drawing Sheets

Figure 1:
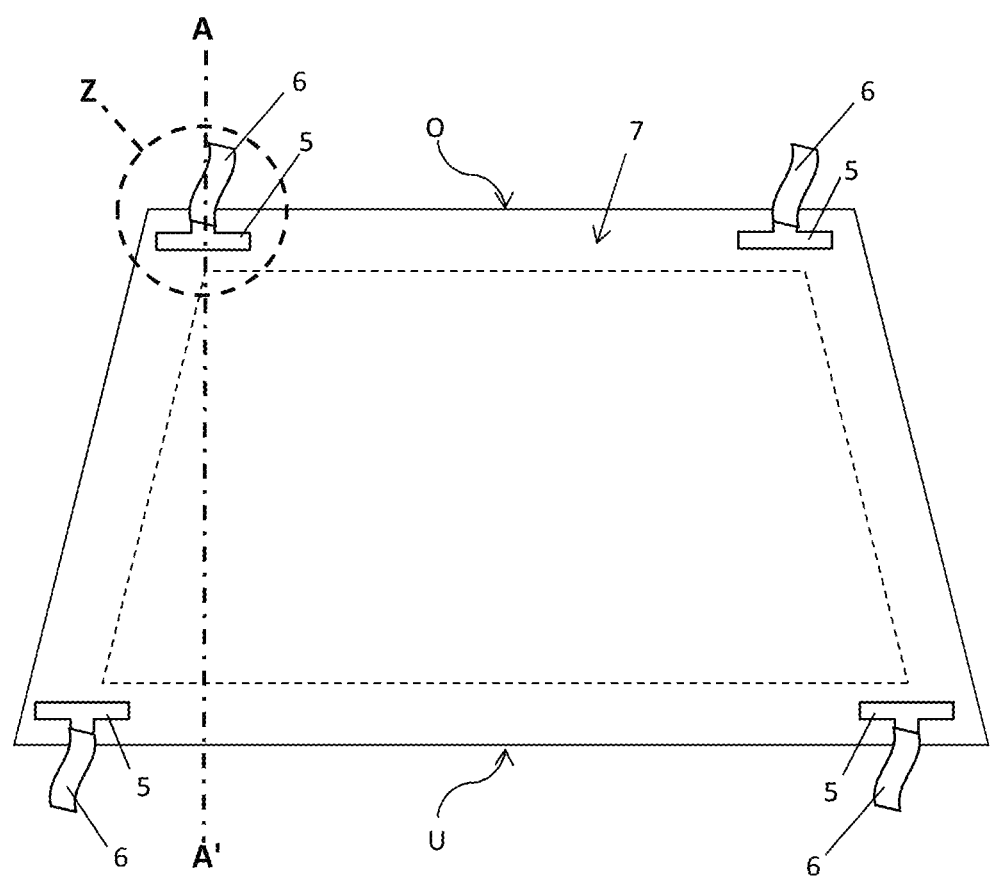

(51) Int. Cl.
*B60Q 1/00* (2006.01)
*G01J 1/44* (2006.01)
*G02F 1/01* (2006.01)
*B60Q 3/80* (2017.01)
*B60Q 1/14* (2006.01)
*B60R 16/023* (2006.01)

(52) U.S. Cl.
CPC .. *B32B 17/10293* (2013.01); *B32B 17/10761* (2013.01); *B32B 17/10788* (2013.01); *B60Q 1/00* (2013.01); *B60Q 1/0023* (2013.01); *G01J 1/44* (2013.01); *G02F 1/0126* (2013.01); B32B 2457/08 (2013.01); B32B 2605/00 (2013.01); *B60Q 1/1423* (2013.01); *B60Q 3/80* (2017.02); B60Q 2300/314 (2013.01); B60R 16/0237 (2013.01); G01J 2001/446 (2013.01); G01J 2001/448 (2013.01)

(58) Field of Classification Search
CPC . B32B 17/1077; B32B 17/10788; B60Q 1/00; B60Q 1/0023; G01J 1/446; G02F 1/0126
See application file for complete search history.

(56) References Cited

U.S. PATENT DOCUMENTS

| | | |
|---|---|---|
| 2006/0275599 A1 | 12/2006 | Lefevre |
| 2008/0225395 A1* | 9/2008 | Veerasamy ....... B32B 17/10036 359/601 |
| 2010/0238636 A1 | 9/2010 | Mascaro et al. |
| 2018/0326705 A1 | 11/2018 | Effertz et al. |

OTHER PUBLICATIONS

International Search Report for International Application No. PCT/EP2016/077536 filed Nov. 14, 2016 on behalf of Saint-Gobain Glass France, dated Feb. 2, 2017. 7 pages. (German + English Translation).
Written Opinion for International Application No. PCT/EP2016/077536 filed Nov. 14, 2016 on behalf of Saint-Gobain Glass France, dated Feb. 2, 2017. 17 pages. (German + English Translation).
Written Opinion for International Application No. PCT/EP2016/077534 filed Nov. 14, 2016 on behalf of Saint-Gobain Glass France, dated Jan. 25, 2017. 12 pages. (German + English Translation).

* cited by examiner

VEHICLE COMPOSITE PANE WITH AN INTEGRATED LIGHT SENSOR

CROSS-REFERENCE TO RELATED APPLICATIONS

The present application is the U.S. National Stage of International Patent Application No. PCT/EP2016/077534 filed on Nov. 14, 2016 which, in turn, claims priority to European Patent Application No. 15198195.8 filed on Dec. 7, 2015.

The invention relates to a vehicle composite pane with an integrated light sensor, a method for production thereof, and use thereof.

It is known to equip vehicles with light sensors to determine the amount of available daylight, and, on this basis, to operate the vehicle headlights as needed. Conventional light sensors are installed as add-on parts, in particular on the interior-side surface of the windshield, for example, in the region of the rearview mirror.

From EP2100722A2, a light sensor is known, which is laminated into a windshield, i.e., is arranged between the outer pane and the inner pane of the windshield, which are bonded to one another by a thermoplastic intermediate layer. Thus, the windshield can be provided compactly with the integrated light sensor; subsequent mounting of the light sensor is eliminated. The light sensor is implemented in the form of flip-chip photodiodes on a circuit board.

The object of the present invention is to provide a further improved vehicle composite pane with an integrated light sensor.

The object of the present invention is accomplished according to the invention by a vehicle composite pane according to the disclosure. Preferred embodiments are also disclosed.

The vehicle composite pane with an integrated light sensor according to the invention comprises at least an outer pane and an inner pane that are bonded to one another via a thermoplastic intermediate layer. The vehicle composite pane is provided for separating a vehicle interior from an outside environment. The vehicle composite pane is thus a window pane that is inserted in a window opening of the vehicle chassis or is intended for that purpose. The vehicle pane according to the invention is, in particular, a windshield of a motor vehicle. The term "inner pane" refers to that pane that faces the interior of the vehicle in the installed position. The term "outer pane" refers to that pane that faces the external environment of the vehicle in the installed position. The thermoplastic intermediate layer is typically formed from at least one thermoplastic film.

That surface of the respective pane that faces the external environment of the vehicle in the installed position is referred to as the "exterior-side surface". That surface of the respective pane that faces the interior of the vehicle in the installed position is referred to as the "interior-side surface". The interior-side surface of the outer pane is bonded to the exterior-side surface of the inner pane via the thermoplastic intermediate layer. Customarily, the exterior-side surface of the outer pane is referred to as "side I", the interior-side surface of the outer pane as "Side II", the exterior-side surface of the inner pane as "side III", and the interior-side surface of the inner pane as "side IV".

At least one photodiode situated on a circuit board is arranged between the outer pane and the inner pane. The circuit board with the photodiode functions as a light sensor. It is suitable for detecting an amount of ambient light when it is connected to corresponding evaluation electronics of the vehicle. Depending on the ambient light measured, the switching state of the headlights can, for example, be controlled automatically by the evaluation and control electronics. Thus, convenience is enhanced for the vehicle driver, who no longer has to take care of manually turning the headlights on and off. Other applications are, for example, automatic electrical switching of the transmittance properties of the entire pane or a region of the pane and the brightness control of display elements in the vehicle interior.

In the context of the invention, the term "light sensor" or "light sensor element" means a circuit board with at least one photodiode arranged thereon.

In a preferred embodiment, the photodiode is an SMD component. As is generally known to the person skilled in the art, SMD is the acronym for surface-mount device. SMD components have no wire connections, but are, instead, soldered directly onto the circuit board by means of solderable connection pads. Conventional components must be routed through mounting holes and soldered on the back of the circuit board. This is eliminated with SMD components. Thus, very dense mountings become possible, reducing space requirements. Advantageously from a process technology standpoint, the drilling of holes in the circuit board is eliminated. Weight is reduced through smaller components and the elimination of connecting wires. SMD technology is also particularly suitable for automated mounting (automated picking and placing of photodiodes, automated soldering), which is particularly advantageous for industrial mass production. SMD photodiodes typically have a housing, in particular a plastic housing, around the actual chip, which differentiates them, for example, from flip-chip photodiodes.

The photodiode should be sensitive in the visible spectral range. Advantageously, the spectral sensitivity distribution should be aligned with that of the human eye such that the light amount measured matches the amount of light perceived by the vehicle occupants as well as possible. Unwanted switching operations that are caused by radiation not perceived as relevant by humans can be avoided, even with the use of only a single photodiode as a light sensor. Advantageous adaptation exists when the photodiode has sensitivity in the entire spectral range between 500 nm and 600 nm, which corresponds to at least 50% of its sensitivity maximum, preferably at least 60%. The sensitivity maximum should be in the range from 450 nm to 600 nm, in particular in the range from 490 nm to 570 nm. Sensitivity can also be referred to as detection efficiency and can be quantified as the ratio of photons detected to the total number of photons of the respective wavelengths impacting the photodiode. The desired spectral sensitivity is ideally influenced by the type of active material of the photodiode. However, alternatively, an optical filter can be used to achieve the desired spectral sensitivity, for example, a filter film arranged externally to the photodiode.

The circuit board can also be referred to as a card, printed circuit, or printed circuit board (PCB). It serves for mechanical attachment and electrical connection of the photodiodes arranged thereon. Circuit boards are made of electrically insulating material, in particular plastic, with conducting connections (conductor tracks) adhering thereon. The conductor tracks can have local widenings that serve as soldering pads for the components.

In a preferred embodiment, the circuit board is a flexible circuit board, also known as a flexboard. Such circuit boards are formed from flexible, bendable polymer films, for example, polyimide films. They have a thickness of preferably less than 0.38 µm and greater than 50 µm, particularly preferably of 120 μm to 180 μm. Therewith, particularly good results are achieved in terms of flexibility, on the one hand, and stability, on the other. Because of the flexibility and the low thickness, flexible circuit boards are particularly suitable for being laminated into a composite pane, in particular a curved composite pane.

If the photodiodes are SMD components, an SMD circuit board is expediently used.

The circuit board can be arranged directly on one of the panes, in particular with the side facing away from the photodiode on the exterior-side surface of the inner pane. It has been demonstrated that the presence of the physically limited circuit board does not result in a substantial reduction in the stability of the laminate. The circuit board can, however, also be arranged between two thermoplastic layers, i.e., between two plies of the thermoplastic intermediate layer.

The circuit board has two connection pads for external electrical contacting (anode and cathode). These connection pads serve for connecting the circuit board to external evaluation and control electronics via connection cables in order to forward the current pulse generated by the photodiode upon incidence of light to the evaluation and control electronics. The contacting of the connection pads is preferably done with a flat conductor (also called a flat strip conductor or film conductor), comprising an electrically conducting film and an optional polymeric sheathing, which must, of course, have an opening at the connection point. Preferably, a flat conductor is connected to the connection points of the circuit board, for example, via a soldering compound or an electrically conductive adhesive. Preferably, a two-pole flat conductor is used, with each pole connected to a connection pad. However, alternatively, a separate flat conductor can be used for each connection pad. The flat conductor preferably has, on its end away from the circuit board, a plug connector (plug or coupling) for connection to additional cables of the vehicle's electrical system.

The circuit board is preferably arranged completely within the interior of the composite pane and contacted by a flat conductor that extends out of the composite pane beyond the side edge. The contacting of the circuit board by the flat conductor is done before the production of the composite pane, in which the circuit board is then arranged in the composite stack such that it is arranged completely within the area of the panes. The advantage consists in a reduced risk of breakage for the circuit board which is typically more susceptible to damage than is the flat conductor.

Alternatively, the circuit board can also extend out of the interior of the composite pane beyond its side edges, with the photodiodes arranged in the interior of the composite pane and the connection pads for the connection cable arranged outside the composite pane. The contacting of the circuit board by the connection cable can then be done after the production of the composite pane. Thus, the composite pane with the integrated light sensor can, for example, be sold without a connection cable to the automaker, who then, before installation of the composite pane, undertakes the contacting. Of course, the flat conductor can also be connected to the circuit board in advance and the composite pane with an integrated light sensor provided together with the connected flat conductor.

It is also conceivable to form the circuit board and the flat conductor in one piece with a plug connector such that the flat conductor is, so to speak, an integral component of the circuit board with a common polymeric sheathing.

The side edge beyond which the circuit board or a flat conductor connected thereto extends is, in the context of the invention, referred to as the side edge that is associated with the circuit board or the light sensor.

In an advantageous embodiment, a plurality of photodiodes, preferably at least four photodiodes, particularly preferably at least six photodiodes, are arranged on a circuit board. The sensitivity can be increased by a light sensor based on a plurality of photodiodes. In addition, measurement errors can be reduced by redundancy, and the use of a plurality of photodiodes also enables measurement of the direction of radiation of the light detected. All photodiodes are arranged on the same side of the circuit board.

The photodiodes are preferably arranged on the circuit board in the form of serially connected groups of parallel connected photodiodes, which is achieved by a suitable arrangement of the conductor tracks on the circuit board. Particularly preferably, two photodiodes are in each case connected pairwise in parallel, and at least two such pairs, in particular, at least three, such pairs are connected in series. This is particularly advantageous with regard to the sensitivity and the redundancy of the light sensor system. By means of the parallel connection within the groups, a signal can still be measured even with partial shading of the light sensor, so long as the entire group is not obscured. In addition, the light sensor is equipped with a sort of spatial resolution such that false signals, triggered, for example, by a streetlight, can be avoided. The sensitivity of the light sensor is increased. Also, the light sensor remains ensured even in the event of failure of individual photodiodes so long as at least one photodiode per group is functional.

In a particularly advantageous embodiment, the photodiodes are arranged in the form of a matrix with rows and columns. The rows preferably run substantially parallel to the associated side edge; the columns, substantially perpendicular to the associated side edge. The photodiodes of one group of parallel connected photodiodes are thus arranged neither all in one column nor all in one row of the matrix. This yields advantageous redundancy: those that are connected in parallel are distributed over the circuit board in such a way that partial shading of the circuit board (for example, the right hand portion of the circuit board or the lower portion of the circuit board) results only in obscuring some of the photodiodes connected in parallel such that a signal can nevertheless be measured.

The distances between adjacent photodiodes of a row is preferably at least 5 cm. Thus, particularly good results are achieved in terms of redundancy relative to partial shading.

Suitable circuit boards from a maximum width of approx. 6 cm are realizable. The circuit board has, in an advantageous embodiment, a maximum width of at least 15 cm, preferably at least 20 cm. In the context of the invention, "width" refers to the dimension substantially parallel to the side edge associated with the light sensor. The maximum width is the largest width that occurs along the entire length of the circuit board if the width is not constant. In other words, the circuit board preferably has at least one section with a width of at least 15 cm, particularly preferably at least 20 cm. When the circuit board has a section with this width, a plurality of photodiodes can advantageously be arranged and high sensitivity can be ensured. In addition, the photodiodes can have adequately large distances between them such that even in the event of partial shading of the light sensor, a signal is still delivered.

The photodiodes are preferably arranged in said section with the minimum width of 15 cm, in particular in the above-described matrix-like arrangement.

The maximum width is, for example, at most 40 cm or 30 cm. In principle, however, the width is limited only by the length of the associated side edge, in particular if the edge region is provided with a continuous opaque masking print that conceals the circuit board along its entire width, or by technical limitations in the production of the circuit boards.

The length of the circuit board is, in an advantageous embodiment, at most 15 cm, preferably at most 10 cm, particularly preferably at most 8 cm. In the context of the invention, "length" refers to the dimension substantially perpendicular to the side edge associated with the light sensor. With these maximum lengths, the circuit board advantageously requires little space and can be concealed behind opaque masking prints of customary widths.

In a preferred embodiment, the circuit board has an end section and a lead section, with the lead section having a smaller width than the end section. The photodiodes are arranged in the end section; and the connection pads for the connection cable, in the lead section, in particular in the vicinity of the end of the lead section facing away from the end section. The lead section is less distant from the associated side edge than the end section and preferably extends out of the composite pane, beyond this side edge. Such a circuit board is implemented in a T-shape, wherein the transverse bar (being the end section) is turned away from the associated side edge. The lead section preferably has a length of 1 cm to 12 cm, particularly preferably of 2 cm to 8 cm. The lead section preferably has a width of 2 cm to 15 cm, particularly preferably of 3 cm to 10 cm. The end section preferably has a length of 0.5 cm to 3 cm, particularly preferably of 1 cm to 2 cm. The end section preferably has a width of 15 cm to 40 cm, particularly preferably of 20 cm to 30 cm. With such a circuit board, particularly good results are obtained in terms of efficiency and space-saving design.

The photodiodes are preferably arranged in the end section of the circuit board, in particular in the aforedescribed matrix-like arrangement.

In an advantageous embodiment, the composite pane includes a plurality of light sensors, i.e., a plurality of circuit boards with, in each case, at least one photodiode. This offers, on the one hand, the advantage of redundancy: in the event of failure of one light sensor, functionality can nevertheless be ensured by the one or more other light sensors. On the other hand, the presence of multiple light sensors distributed over the composite pane enables distinguishing between a local, virtually punctiform source of radiation, such as a streetlight, and the ambient light. Misinterpretations by the evaluation and control electronics can thus be avoided. For example, it is possible to avoid a streetlight being misinterpreted as bright ambient light and the vehicle illumination being turned off at night as a result. Also possible is a determination of the directional dependence of the incident radiation via a comparison of the intensities that are measured by the various light sensors.

The direction of incidence of the light detected can be determined by a plurality of photodiodes on a circuit board or by the use of a plurality of light sensor elements in a composite pane. The directional dependence is derived from the differences in intensity of the measurement signal of the various photodiodes or light sensors. Thus, for example, the current position of the sun can be determined.

In a preferred embodiment, the width of each photodiode is less than 2 mm. Here, the term "width" means the maximum lateral dimension in a plane parallel to the circuit board. With such advantageously small photodiodes, the light sensor can be unobtrusively integrated into the composite pane. Possibly necessary holes in a masking print behind which the light sensor is to be hidden can be designed small and unobtrusive. The height of the photodiodes (dimension perpendicular to the circuit board) is preferably less than 0.7 mm, particularly preferably less than 0.6 mm. The photodiodes can then be integrated into the composite pane with the use of the standard thickness of the thermoplastic intermediate layer of 0.76 mm.

The inner pane and the outer pane are preferably made of glass, particularly preferably soda lime glass, which has proven itself for window glass. However, the panes can also be made, for example, of borosilicate glass or aluminosilicate glass. In principle, the panes can also alternatively be made of plastic, in particular polycarbonate (PC) or polymethylmethacrylate (PMMA).

The thickness of the panes can vary greatly and thus be ideally adapted to the requirements of the individual case. Preferably, the thicknesses of the outer pane are from 0.5 mm to 10 mm, particularly preferably from 1 mm to 5 mm, most particularly preferably from 1.2 mm to 3 mm.

The outer pane, the inner pane, or the intermediate layer can be clear and colorless but also tinted, frosted, or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1. The outer pane and the inner pane can be made of non-prestressed, partially prestressed, or prestressed glass.

The vehicle pane is preferably curved in one or a plurality of spatial directions, as is customary for motor vehicle panes, with typical radii of curvature in the range from approx. 10 cm to approx. 40 m. The composite glass can, however, also be flat, for example, when it is provided as a pane for buses, trains, or tractors.

The intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is formed from at least one thermoplastic film. The thickness of a thermoplastic film is preferably from 0.2 mm to 2 mm, particularly preferably from 0.3 mm to 1 mm, for example, 0.38 mm or 0.76 mm. The intermediate layer can also be implemented as a so-called "acoustic film", which has a noise-damping effect. Such films typically consist of at least three layers, with the middle layer having higher plasticity or elasticity than the outer layers surrounding it, for example, as a result of a different plasticizer content.

The circuit board is preferably arranged in a nontransparent region of the composite glass pane such that it is hardly or not at all visible. In this region, vision through the pane is prevented by an opaque element. For this, in the motor vehicle sector, opaque masking prints on one or on both panes are customary. Alternatively, however, vision through the pane can also be prevented, for example, by a colored thermoplastic film of the intermediate layer or an opaque insert element. Preferably, the opaque element is arranged on the interior side relative to the light sensor, thus having less distance from the interior or from the interior-side surface of the inner pane than the light sensor. Then, the light sensor is not visible from the inside, while light can strike it from the outside such that it can fulfill its function. It can be particularly preferable for opaque elements to be mounted in front of and behind the circuit board in the direction of vision, i.e., an opaque element, in each case, on the interior side and on the exterior side relative to the light sensor.

Then, the circuit board is visible neither from the outside nor from the inside. In order for the light sensor to be able to fulfill its function, the opaque element must, of course, have openings at the position of the photodiodes, since, otherwise, detection of light would not be possible. An opaque element arranged on the interior side relative to the light sensor is preferably realized by a masking print on the inner pane; an opaque element arranged on the exterior side relative to the light sensor, by a masking print on the outer pane. Masking prints are customary for motor vehicle panes outside the central vision region to conceal add-on parts or to protect the adhesive with which the motor vehicle pane is bonded to the body against UV radiation. The masking print typically consists of a black or dark enamel applied and fired in a screen printing process.

It is also possible to combine the light sensor according to the invention with other sensors, enabling advantageously space-saving construction. The light sensor can, for example, be combined with a rain sensor, in particular a capacitive rain sensor which determines the presence of moisture on the pane by means of a capacitive change of at least one electrode. The conductive structures serving as electrodes can, for example, be arranged on the circuit board or on the inner pane. The rain sensor and the light sensor are preferably arranged in spatial proximity to one another or spatially superimposed, thus enabling realization of a space-saving combined sensor element.

The invention further includes a method for producing a vehicle composite pane with an integrated light sensor. Here, first, an outer pane, an inner pane, at least one thermoplastic film, and at least one photodiode situated on a circuit board are arranged as a stack such that the film and the photodiode are arranged between the outer pane and the inner pane. The two panes and the film or films positioned therebetween are, of course, arranged one atop another areally and substantially congruently. The circuit board with the at least one photodiode—or a plurality of such circuit boards—is inserted into a region of this stack. The stack is subsequently subjected to customary methods for producing composite panes. The outer pane is bonded to the inner pane by lamination via a thermoplastic intermediate layer, which is formed during the process from the at least one thermoplastic film. This is done using customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

Preferably, the circuit board is connected in advance to a flat conductor and only arranged in the stack thereafter. Preferably, it is arranged such that the circuit board is arranged completely within the area of the panes and the flat conductor extends beyond its side edges. The connection between the flat conductor and the connection pads of the circuit board can be done, for example, by soldering or via an electrically conductive adhesive.

If the vehicle composite pane is to have a curvature, as customary in particular for automobiles, the panes are subjected, before lamination, to a bending process, for example by gravity bending, suction bending, and/or press bending. Typical bending temperatures are from 500° C. to 700° C.

Preferably, an opaque masking print is applied on the edge region of the outer pane and the inner pane before the lamination and before the optional bending. For this, typically, a black or dark enamel is applied by screenprinting and fired before the lamination, in particular, before the bending or during the bending.

The circuit board can be placed directly on one of the panes, in particular with the side facing away from the photodiode on the exterior-side surface of the inner pane. All films of the intermediate layer are then arranged on one side of the circuit board. However, alternatively, the circuit board can also be inserted between two thermoplastic films that enclose the circuit board in a sandwich-like manner.

A thermoplastic film not further processed in advance can be used. During lamination, the heated, flowable thermoplastic material flows into the spaces around the photodiodes and the circuit board such that a stable composite is ensured.

In order to improve the optical quality of the composite pane, it can be advantageous to prepare the thermoplastic film (or at least one thermoplastic film in the case of use of a plurality of films) by providing recesses for the light sensors.

Large holes, into which the entire circuit board is inserted, can be produced in the film. Preferably, the circuit board is then surrounded sandwich-like by two relatively thin film sections in order to compensate for the difference in height between the circuit board and the film and to ensure the adhesion of the composite.

Alternatively, in an advantageous embodiment, the thermoplastic film is provided with holes or indentations before lamination. These holes or indentations are coordinated in size, position, and arrangement with the at least one photodiode. This means that the lateral dimensions of the holes or indentations substantially correspond to the dimensions of the photodiodes or are slightly larger, in particular are at most 150% or at most 120% of the dimensions of the photodiodes. The position of the holes or indentations corresponds to the desired positioning of the light sensor in the composite pane to be manufactured. The arrangement of the holes or indentations relative to one another corresponds to the arrangement of the photodiodes relative to one another, if a plurality of photodiodes are used. The holes and indentations, on the one hand, and the photodiodes, on the other, are thus, so to speak, in a key-to-keyhole relationship with one another. At the time of arrangement of the stack for lamination, the photodiodes are inserted into the holes or indentations. Thus, the photodiodes are effectively embedded in the intermediate layer. Moreover, the position of the photodiodes is defined during production—advantageous in terms of mass production. The holes or indentations can be produced just prior to the lamination. However, the films with the defined holes or indentations can also be prepared in large quantities or even procured in this form from the film supplier.

The film can be provided with through-holes. If the film has a thickness that is greater than the height of the photodiodes, an actually undesirable cavity remains. This can, optionally, for example, be filled by small cutouts of the thermoplastic film. More advantageously, since it is simpler from a process technology standpoint, the film can be provided with indentations whose depth substantially corresponds to the height of the photodiodes instead of through-holes. The undesirable cavity is thus avoided without necessary postproduction work. The indentations are introduced, for example, by stamping.

During production, the circuit board is fixed on the thermoplastic film by the holes or indentations associated with the individual photodiodes. Additional fastening, for example, using adhesive tape, is, consequently, unnecessary and is preferably not carried out.

The invention also includes the use of a vehicle composite pane according to the invention with an integrated light sensor as a windshield of a vehicle, preferably a motor vehicle, in particular an automobile. Preferably, the at least one photodiode is connected to evaluation and control electronics of the vehicle. As a function of the ambient light measured by the at least one photodiode, one or a plurality of the following switching states is controlled:

the switching state of the vehicle lighting (in particular headlights, taillights, and side marker lights): upon dropping below a predefined threshold value, the lighting is turned on; upon exceeding the predefined threshold, the lighting is turned off.

the transmittance properties of a region of the composite pane that is equipped with an electrically switchable or controllable functional element. Said region of the pane is in particular a switchable or controllable glare shield in the upper one third of the pane (also known as a "shaded band"). The switching state can be controlled as a function of the absolute amount of ambient light or as a function of the position of the sun derived by location-dependent measurement with multiple photodiodes or light sensor elements. In particular, with a low position of the sun, the glare shield is necessary. The controllable functional element can be, for example, an SPD element (suspended particle device) or an LC element (liquid crystal) or an electrochromic element.

the intensity (brightness) of display elements in the vehicle interior, for example, LED display elements or OLED display elements. The display elements are, for example, warning lights or information displays, in particular in the form of pictograms or alphanumeric indicators.

The invention also includes a vehicle, preferably a motor vehicle, in particular an automobile, with a composite pane according to the invention as a windshield and evaluation and control electronics, connected, on the one hand, to the photodiode and, on the other, to the vehicle lighting, to control the switching state of the vehicle lighting as a function of the ambient light measured by the at least one photodiode;

an electrically switchable or controllable functional element that is arranged in a region of the composite pane, in order to control the transmittance properties of said region as a function of the ambient light measured by the at least one photodiode, said region is preferably a switchable or controllable glare shield in the upper one third of the pane; and/or display elements in the vehicle interior, to control their intensity (brightness) as a function of the ambient light measured by the at least one photodiode.

The invention is explained in detail in the following with reference to drawings and exemplary embodiments. The drawings are schematic representations and not true to scale. The drawings in no way restrict the invention.

Figure 2:
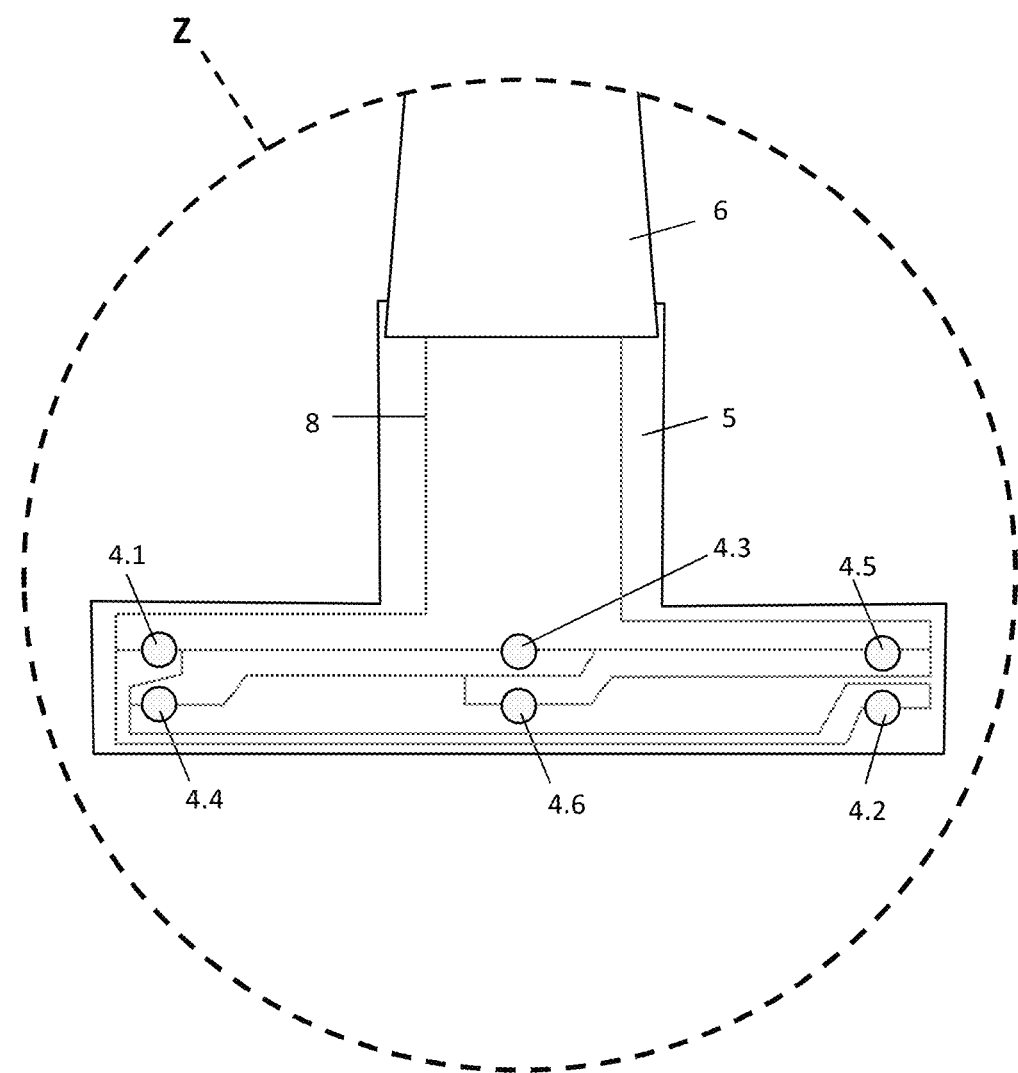
Figure 3:
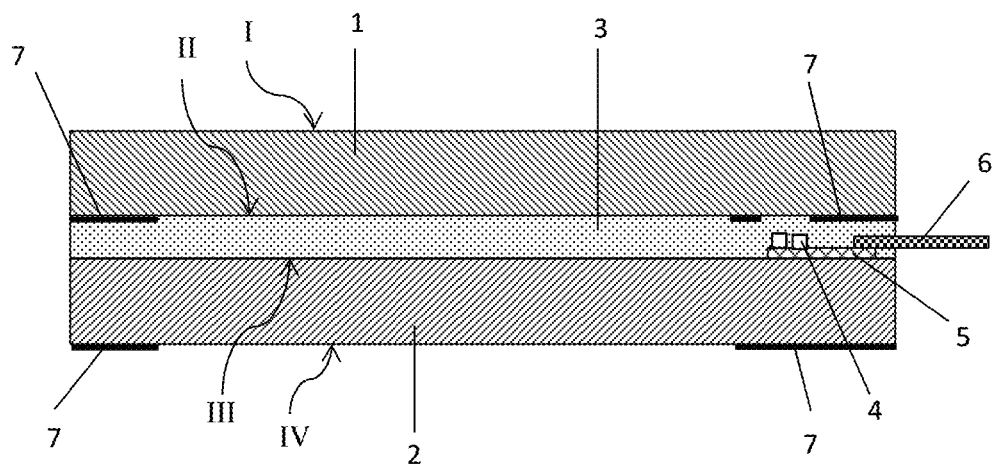
Figure 4:
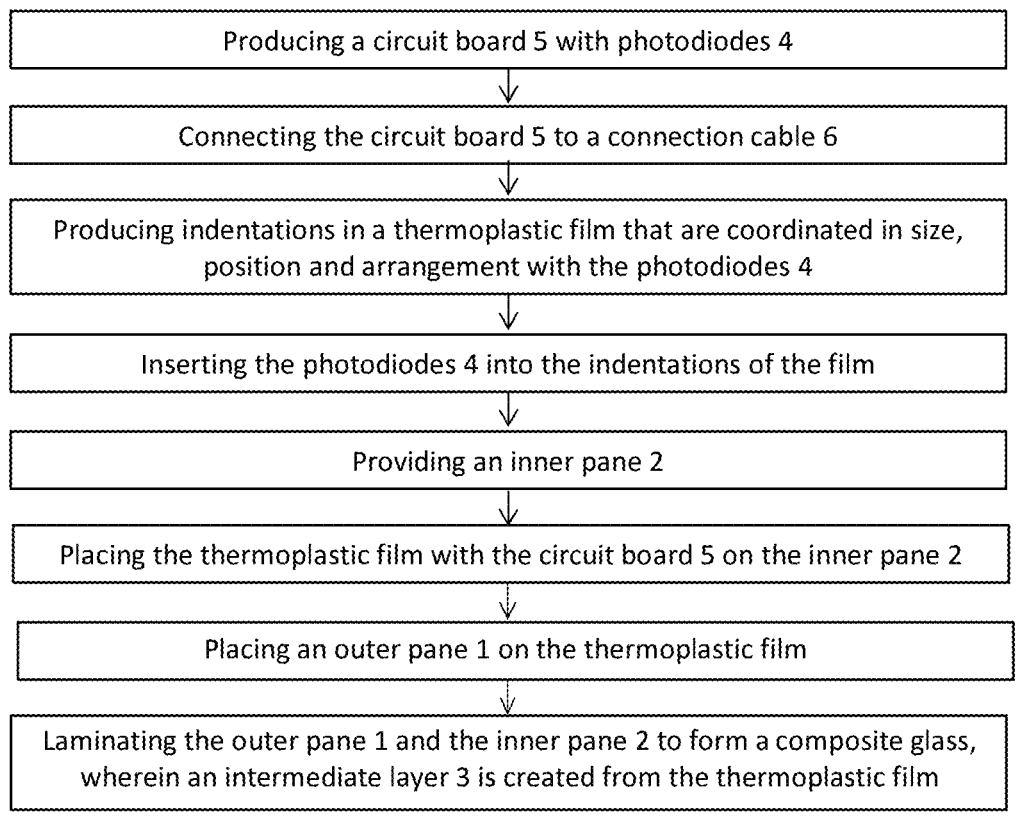

They depict:

FIG. 1 a plan view of an embodiment of the vehicle composite pane according to the invention, FIG. 2 an enlarged view of the detail Z of FIG. 1, FIG. 3 a cross-section along A-A' through the vehicle composite pane of FIG. 1, and FIG. 4 a flowchart of an embodiment of the method according to the invention.

FIG. 1, FIG. 2, and FIG. 3 depict in each case a detail of a vehicle composite pane according to the invention with an integrated light sensor. The composite pane is made up of an outer pane 1 (with an exterior-side surface I and an interior-side surface II) and an inner pane 2 (with an exterior-side surface III and an interior-side surface IV) that are a really bonded to one another via a thermoplastic intermediate layer 3. The outer pane 1 and the inner pane 2 are made of soda lime glass and have, for example, a thickness of 2.1 mm. The intermediate layer 3 is formed from a 0.76-mm-thick film made of polyvinyl butyral (PVB). The composite pane is intended as a windshield of a motor vehicle.

The composite pane is equipped with four light sensors. Each light sensor consists of a flexible circuit board 5, equipped in each case with six SMD photodiodes 4. Each light sensor is arranged, by way of example, in a corner region of the composite pane, with two light sensors associated with the upper edge O and two light sensors associated with the lower edge U of the composite pane. The circuit board 5 is arranged completely within the composite pane. It is positioned directly on the exterior-side surface III of the inner pane 2 and is bonded to the outer pane via the intermediate layer 3. It has two electrical connection pads (not shown) that are soldered, in each case, to one pole of a two-pole flat conductor as a connection cable 6. The connection cable 6 extends out of the composite beyond the respective associated edge O, U. The connection cables 6 serve for the electrical connection of the circuit boards 5 via additional connector cables (typically round cables) to evaluation and control electronics as part of the onboard electronics of the vehicle. The evaluation and control electronics analyze the signals of the light sensors—thus, for example, the evaluation and control electronics can switch the vehicle lighting on or off as a function of the amount of ambient light determined by the light sensors.

As a result of the plurality of light sensors, the system can distinguish between the ambient light that is measured by all light sensors with substantially equal intensity and a local light source such as a streetlight which is measured with sharply different intensity by the distributed light sensors. Significantly smaller differences of intensity can be considered with suitable evaluation electronics for determining the position of the sun: the ratio of light intensities that are detected by the light sensors on the upper edge O, on the one hand, and those on the lower edge U, on the other, depends on the position of the sun, i.e., on the angle at which the radiation strikes the composite pane.

Suitable as photodiodes 4 are, for example, photodiodes of the type APDS-9005 from the company Avago Technologies. They have advantageously small dimensions (height 0.55 mm, width 1.6 mm, depth 1.5 mm) and a spectral sensitivity distribution that very closely mimics that of the human eye. The sensitivity maximum is approx. 500 nm; and in the entire range from 500 nm to 600 nm, the sensitivity is more than 60% of the maximum value at 500 nm. This ensures that the amount of light measured by the light sensor also matches that considered relevant by humans.

The circuit board 5 is a flexible circuit board, comprising an approx. 150-μm-thick polyimide film and conductor tracks 8 printed thereon. Each circuit board 5 is designed T-shaped and has a thinner lead section and a wide end section (corresponding to the "crossbar of the T"), with the lead section facing the associated edge O, U. The lead section has, for example, a width of 50 mm and a length of 65 mm. The end section has, for example, a width of 200 mm and a length of 15 mm. All photodiodes 4 of a circuit board are arranged in the end section, whereas the lead section serves for the connection to the connection cable 6. Two connection pads (not shown) that correspond to the two poles of the system of conductor tracks 8 and that are in each case soldered to one pole of the two-pole connection cable 6 are arranged on the end of the lead section.

Each circuit board 5 is equipped with six photodiodes 4. The photodiodes are arranged matrix-like in 2 rows and 3 columns. The photodiodes 4 are connected to one another by the conductor tracks 8 on the circuit board 5. Each photodiode 4 has two connection pads (in/out), which are, in each case, soldered onto a conductor track 8.

In each case, two photodiodes 4 are connected in parallel, and the three parallel-connected pairs are connected in series. In the example depicted, the photodiodes 4.1 and 4.2 are connected in parallel, as are the photodiodes 4.3 and 4.4 and as are the photodiodes 4.5 and 4.6. The two photodiodes of a parallel-connected pair are, in each case, arranged in different rows and columns of the matrix. This ensures that even with partial shading of the circuit board, for example, of the right-hand region with the photodiodes 4.2 and 4.5, at least one photodiode of each pair is illuminated by light and thus, despite the partial shading, a light signal is measured overall. The distance between adjacent photodiodes 4 in the rows is, for example, 9 cm; in the columns, for example, 1 cm.

The composite pane has, as is customary for windshields, a frame-like opaque masking print 7. The masking print 7 is implemented as printed and fired black enamel on the interior-side surfaces II, IV of the outer pane 1 and the inner pane 2. The circuit boards 5 are arranged in the region of the masking print 7 such that they are visible neither from the outside nor from the inside. The outer masking print 7 on the outer pane 1 has holes at the sites of the photodiodes 4 such that light can fall on the photodiodes 4 and the light sensor can fulfill its function.

FIG. 4 depicts a flowchart of an exemplary embodiment of the method according to the invention for producing a vehicle composite pane with an integrated light sensor.

LIST OF REFERENCE CHARACTERS (1) outer pane
(2) inner pane
(3) thermoplastic intermediate layer
(4) photodiode
(4.1), (4.2), (4.3), (4.4), (4.5), (4.6) photodiodes
(5) circuit board (printed circuit board, PCB)
(6) connection cable/flat conductor
(7) opaque masking print
(8) conductor track
(O) upper edge of the composite pane
(U) lower edge of the composite pane
(I) exterior-side surface of the outer pane 1
(II) interior-side surface of the outer pane 1
(III) exterior-side surface of the inner pane 2
(IV) interior-side surface of the inner pane 2
A-A' section line
Z enlarged detail

The invention claimed is:

1. A vehicle composite pane with an integrated light sensor, comprising:
an outer pane; and
an inner pane;
wherein
the outer pane and the inner pane are bonded to one another via a thermoplastic intermediate layer,
at least four photodiodes situated on a circuit board are arranged between the outer pane and the inner pane, the at least four photodiodes being serially connected groups of parallel connected photodiodes, and
each of the at least four photodiodes is a surface-mounted device component.

2. The vehicle composite pane according to claim 1, wherein the circuit board is implemented as a flexible circuit board.

3. The vehicle composite pane according to claim 1, wherein the at least four photodiodes are arranged as a matrix with rows and columns and wherein photodiodes of the parallel connected photodiodes are arranged neither all in one column nor all in one row.

4. The vehicle composite pane according to claim 3, wherein a distance between adjacent photodiodes of a row is at least 5 cm.

5. The vehicle composite pane according to claim 1, wherein the circuit board has a circuit board section with a width of at least 15 cm.

6. The vehicle composite pane according to claim 5, wherein the at least four photodiodes are arranged in the circuit board section.

7. The vehicle composite pane according to claim 1, wherein the at least four photodiodes have, in an entire spectral range between 500 nm and 600 nm, a sensitivity that corresponds to at least 50% of a maximum sensitivity.

8. The vehicle composite pane according to claim 1 wherein the composite pane includes a plurality of circuit boards, and each of the circuit boards contains at least four photodiodes.

9. The vehicle composite pane according to claim 1, wherein the at least four photodiodes each have a width of less than 2 mm.

10. A method for producing a vehicle composite pane with an integrated light sensor, comprising:
providing an outer pane, an inner pane, a thermoplastic film, and at least one photodiode situated on a circuit board;
arranging the outer pane, the inner pane, the thermoplastic film and the circuit board in a stack such that the at least one photodiode is arranged between the outer pane and the inner pane;
forming an intermediate layer from the thermoplastic film; and
bonding, by lamination, the outer pane to the inner pane via the intermediate layer,
wherein the thermoplastic film is provided with holes or indentations that are coordinated in size, position and arrangement with the at least one photodiode,
the method further comprising inserting the at least one photodiode into the holes or indentations, before the step of arranging the outer pane, the inner pane, the thermoplastic film and the circuit board in a stack.

11. A method of using a vehicle composite pane with an integrated light sensor, comprising:
providing a composite pane according to claim 1; and
using the composite pane as a windshield of a vehicle.

12. The method according to claim 11, further comprising:
connecting the one or more photodiodes to evaluation and control electronics of the vehicle; and
controlling a switching state of a vehicle lighting, transmittance properties of a pane region, and/or intensity of display elements in a vehicle interior as a function of an ambient light measured by the one or more photodiodes.

13. The vehicle composite pane according to claim 1, wherein the at least four photodiodes are four photodiodes.

14. The vehicle composite pane according to claim 1, wherein the at least four photodiodes are six photodiodes.

15. The vehicle composite pane according to claim 1, wherein each of the parallel connected photodiodes comprises two photodiodes.

16. The vehicle composite pane according to claim 15, wherein the groups of parallel connected photodiodes are two groups of parallel connected photodiodes.

17. The vehicle composite pane according to claim 15, wherein the groups of parallel connected photodiodes are three groups of parallel connected photodiodes.

18. The vehicle composite pane according to claim 1, wherein the circuit board has a circuit board section with a width of at least 20 cm.

19. The vehicle composite pane according to claim 1, wherein the at least four photodiodes have, in an entire spectral range between 500 nm and 600 nm, a sensitivity that corresponds to at least 60% of a maximum sensitivity.

20. The method according to claim 11, wherein the a vehicle is a motor vehicle.

* * * * *